(12) United States Patent
Genseberger (10) Patent No.: US 6,227,090 B1
(45) Date of Patent: May 8, 2001

(54) OSCILLATING ASSEMBLY FOR PIVOTING A BLANKING DIE

(75) Inventor: Erich Genseberger, Bolton (CA)

(73) Assignee: Cosma International Inc., Ontario (CA)

( * ) Notice: Subject to any disclaimer, the term of this patent is extended or adjusted under 35 U.S.C. 154(b) by 0 days.

(21) Appl. No.: 09/422,991

(22) Filed: Oct. 22, 1999

Related U.S. Application Data
(60) Provisional application No. 60/107,135, filed on Nov. 5, 1998.

(51) Int. Cl.$^7$ ............................................. B26D 5/20
(52) U.S. Cl. ........................ 83/240; 83/215; 83/236; 83/251; 83/263; 83/315; 83/559
(58) Field of Search ............................... 83/215, 236, 240, 83/251, 257, 263, 284, 315, 321

(56) References Cited

U.S. PATENT DOCUMENTS

| | | | |
|---|---|---|---|
| 2,269,714 | 1/1942 | Fenton | 83/212 |
| 3,440,910 | 4/1969 | Scribner | 83/94 |
| 3,455,197 | 7/1969 | Richardson | 83/468.3 |
| 4,077,287 | 3/1978 | Makeev et al. | 83/92 |
| 4,606,250 | 8/1986 | Krosbacher et al. | 83/161 |
| 4,739,683 | 4/1988 | Ogawa | 83/320 |
| 4,869,141 | * 9/1989 | Klingel | 83/559 |
| 4,942,797 | 7/1990 | Nakamura | 83/76.9 |
| 5,113,733 | * 5/1992 | Peterson et al. | 83/559 |

* cited by examiner

Primary Examiner—W. Donald Bray
(74) Attorney, Agent, or Firm—Pillsbury Winthrop LLP (57) ABSTRACT

The present invention relates to an oscillating assembly for pivoting a blanking die that is constructed and arranged to cut blanks from sheet material. The oscillating assembly comprises a die supporting structure that pivots about a pivot axis. The die supporting structure receives and supports the die such that the sheet material can be fed into the die in a feeding direction and such that the pivoting of the die supporting structure pivots the die relative to the sheet material. A reversible rotary driving assembly rotates a rotatable output shaft in opposing first and second rotational directions. A linearly movable die driver is operatively connected to the output shaft such that (a) rotating the shaft in the first rotational direction thereof moves the die driver generally linearly in a first die driving direction and (b) rotating the shaft in the second rotational direction thereof moves the die driver generally linearly in a second die driving direction opposite the first die driving direction. The die driver is operatively connected to the die supporting structure such that (a) moving the die driver in the first die driving direction thereof as aforesaid pivots the die supporting structure to a first cutting position wherein the blanking die can cut a first blank from the sheet material fed therein and (b) after cutting the first blank and advancing the sheet material relative to the die in the feeding direction, moving the die driver in the second die driving direction thereof as aforesaid pivots the die supporting structure to a second cutting position wherein the blanking die can cut a second blank from the sheet material.

12 Claims, 11 Drawing Sheets

OSCILLATING ASSEMBLY FOR PIVOTING A BLANKING DIE

The present application claims priority to U.S. Provisional Application of Genseberger, Ser. No. 60/107,135, filed Nov. 5, 1998, the entirety of which is hereby incorporated into the present application by reference.

FIELD OF THE INVENTION

The present invention relates to an oscillating assembly for pivoting a blanking die.

BACKGROUND OF THE INVENTION

It has been known to pivot a blanking die in an oscillatory manner between angularly displaced cutting positions wherein the die cuts through sheet material, such as steel, in order to form trapezoidal blanks. Trapezoidal blanks are particularly desirable when forming components having a tapered configuration, such as an automobile hood, because they reduce the amount of material which must be trimmed off and discarded as scrap, thereby realizing a savings in material and manufacturing costs. Some known assemblies have utilized air cylinders to drive the blanking die about its pivot axis. However, utilizing air cylinders is relatively slow and it is difficult to control the angular displacement of the blanking die with a desirable degree of precision.

Other types of assemblies utilize a servomotor and gear the servomotor to a vertically extending turnable shaft which is coextensive with the pivot axis of the die. An example of such an assembly is disclosed in U.S. Pat. No. 4,942,797 to Nakamura. In the assembly of the '797 patent, a series of intermeshed gears are used to translate the rotation of the servomotor into turning of the turnable shaft and pivotal movement of the die. Over time, the teeth on these gears may wear down. Furthermore, utilization of a plurality of intermeshed gears increases the complexity and cost of the assembly and its maintenance.

SUMMARY OF THE INVENTION

It is therefore an object of the present invention to provide an oscillating assembly for pivoting a blanking die which is simpler in construction and affords a relatively high degree of precision in controlling the pivotal movement of the die mounted thereon. It is also an object of the present invention to provide an oscillating assembly which is able to rapidly oscillate between angularly displaced cutting positions so as to increase manufacturing efficiency.

To achieve these objects, the present invention provides an oscillating assembly for pivoting a blanking die that is constructed and arranged to cut blanks from sheet material. The oscillating assembly comprises a die supporting structure that pivots about a pivot axis. The die supporting structure receives and supports the die such that the sheet material can be fed into the die in a feeding direction and such that the pivoting of the die supporting structure pivots the die relative to the sheet material. A reversible rotary driving assembly rotates a rotatable output shaft in opposing first and second rotational directions. A linearly movable die driver is operatively connected to the output shaft such that (a) rotating the shaft in the first rotational direction thereof moves the die driver generally linearly in a first die driving direction and (b) rotating the shaft in the second rotational direction thereof moves the die driver generally linearly in a second die driving direction opposite the first die driving direction. The die driver is operatively connected to the die supporting structure such that (a) moving the die driver in the first die driving direction thereof as aforesaid pivots the die supporting structure to a first cutting position wherein the blanking die can cut a first blank from the sheet material fed therein and (b) after cutting the first blank and advancing the sheet material relative to the die in the feeding direction, moving the die driver in the second die driving direction thereof as aforesaid pivots the die supporting structure to a second cutting position wherein the blanking die can cut a second blank from the sheet material.

Other objects, features, and advantages of present invention will become apparent from the following detailed description and the accompanying drawings.

DETAILED DESCRIPTION OF THE PREFERRED EMBODIMENT OF THE INVENTION

Figure 1:
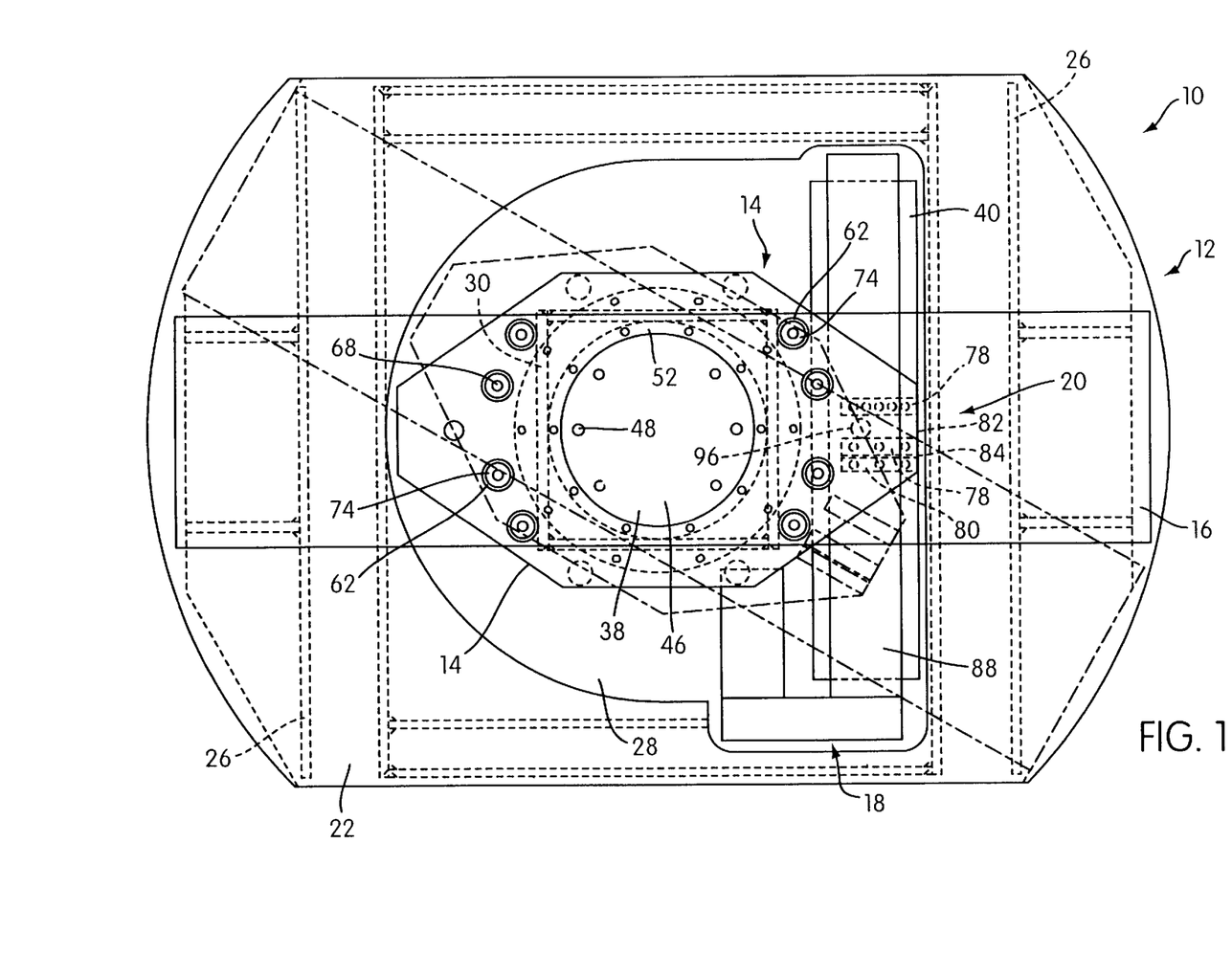
FIG. 1 is a top plan view of an oscillating assembly constructed in accordance with the principles of the present invention.
Figure 2:
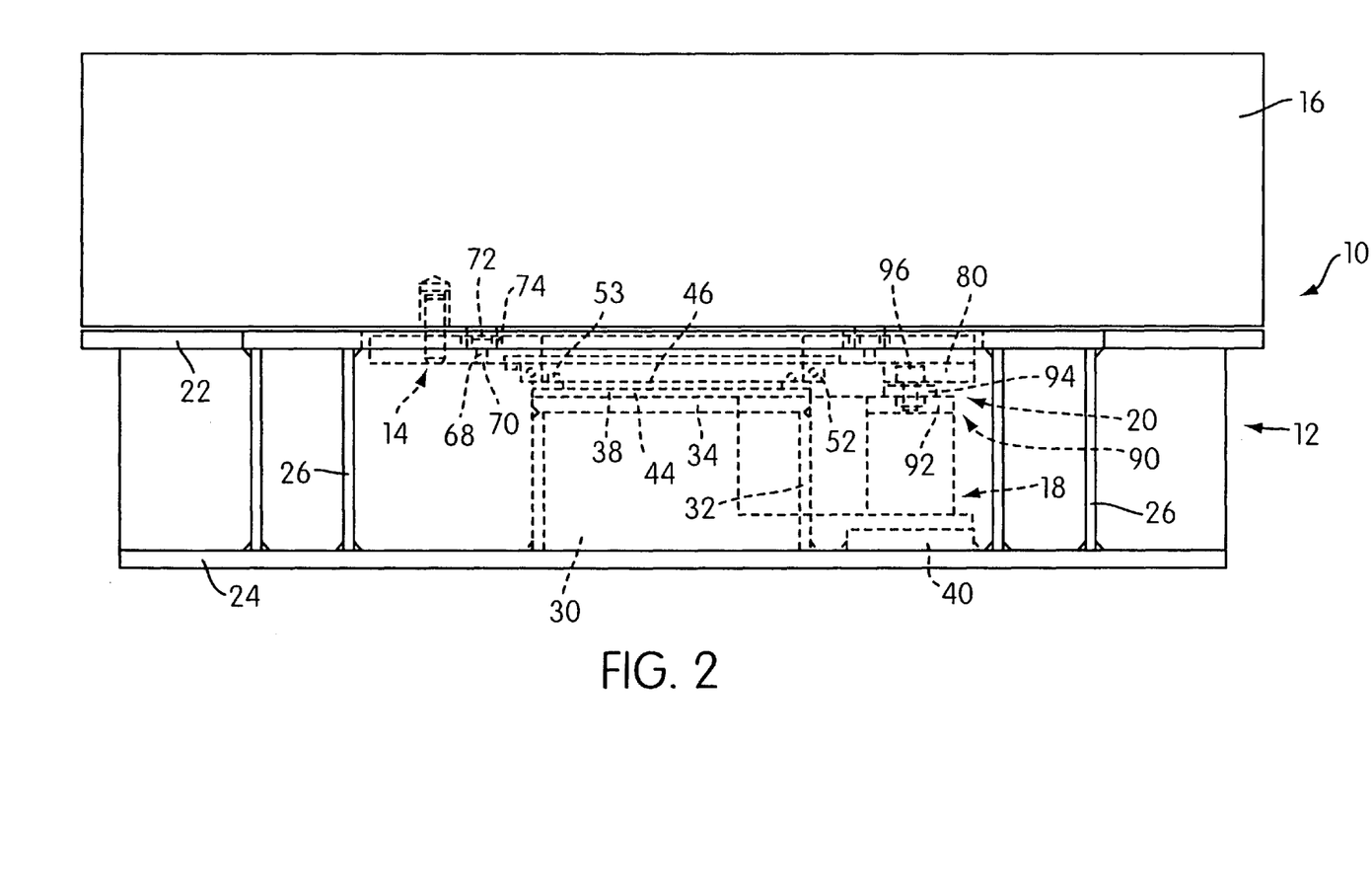
FIG. 2 is a side plan view of the oscillating assembly of FIG. 1.

FIGS. 1 and 2 show an oscillating assembly, generally indicated at 10, constructed in accordance with the principles of the present invention for pivoting a blanking die. The oscillating assembly 10 includes a fixed base structure, generally indicated at 12, and a die supporting structure in the form of a die supporting platform, generally indicated at 14. The die supporting platform 14 is constructed and arranged to support a blanking die, generally indicated at 16, in spaced relation above an upwardly facing die supporting surface thereof. A reversible driving assembly, generally indicated at 18, and a motion transmitting assembly, generally indicated at 20, cooperate together to move the die supporting platform 14, along with the blanking die 16 mounted thereon, through cycles of oscillating, pivoting movement about a generally vertically extending pivot axis.

Figure 3:
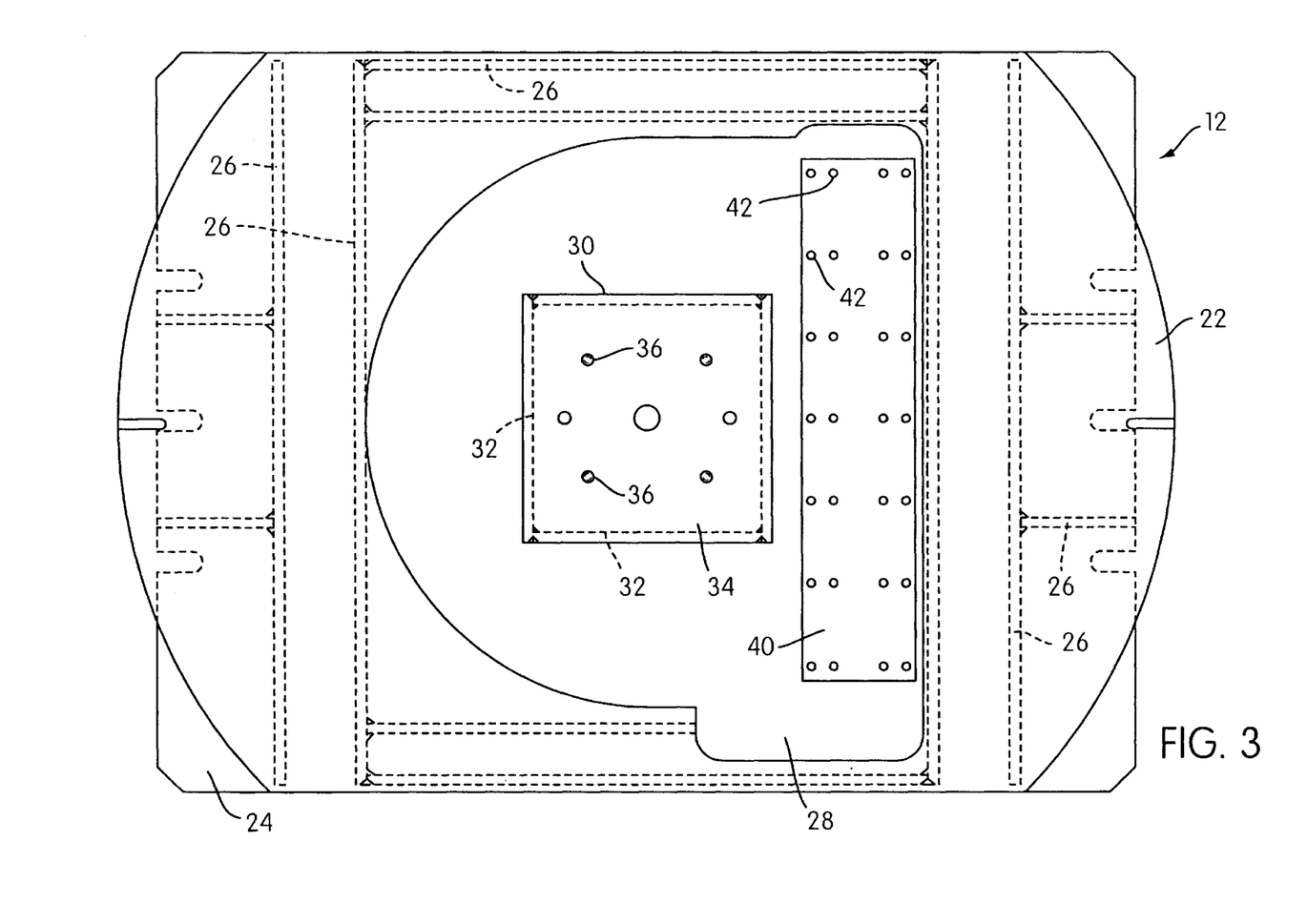
FIG. 3 is a top plan view of the main base structure of the oscillating assembly of FIG. 1.
Figure 4:
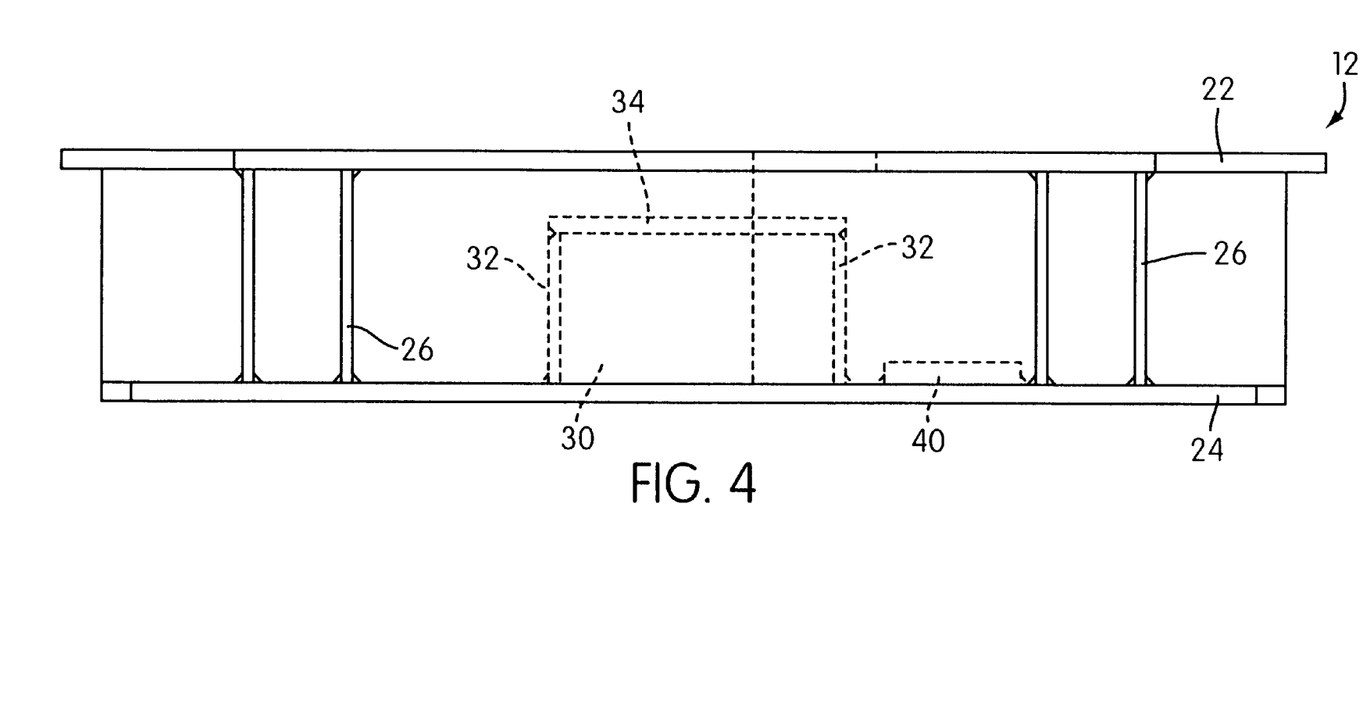
FIG. 4 is a side plan view of the main base structure shown in FIG. 3.

The base structure 12 serves to provide the main structural support and mounting points for the oscillating die supporting structure 14, the reversible driving assembly 18, the motion transmitting assembly 20, and the other structures and elements associated therewith. As best seen in FIGS. 3 and 4, the base structure 12 is made from steel and comprises a plate-like upper base portion 22, a plate-like lower base portion 24, and a plurality of vertically extending support members 26 extending therebetween. The upper base portion 22 has a large central opening 28 formed therethrough which exposes the interior of the base structure 12. Mounted directly to the lower base portion 24 is a fixed mounting structure 30 having four vertically extending sidewalls 32 and a horizontal plate-like top wall 34 mounted on top of the sidewalls 32. The top wall 34 has a plurality of fastener-receiving openings 36 which are configured to receive fasteners for mounting a bearing support structure 38 (discussed below). The fixed mounting structure 30 is disposed directly below the centrally disposed opening 28 and exposed therethrough.

A riser structure 40 is mounted on the lower base portion 24 adjacent to the fixed mounting structure 30 and is disposed below the central opening 28 so as to be exposed therethrough. The riser structure 40 provides a mounting point for the motion transmitting assembly 20. As can be seen best in FIG. 3, a plurality of fastener receiving openings 42 are provided to receive fasteners for fixedly mounting the components associated with the motion transmitting assembly 20, as discussed below.

Figure 5:
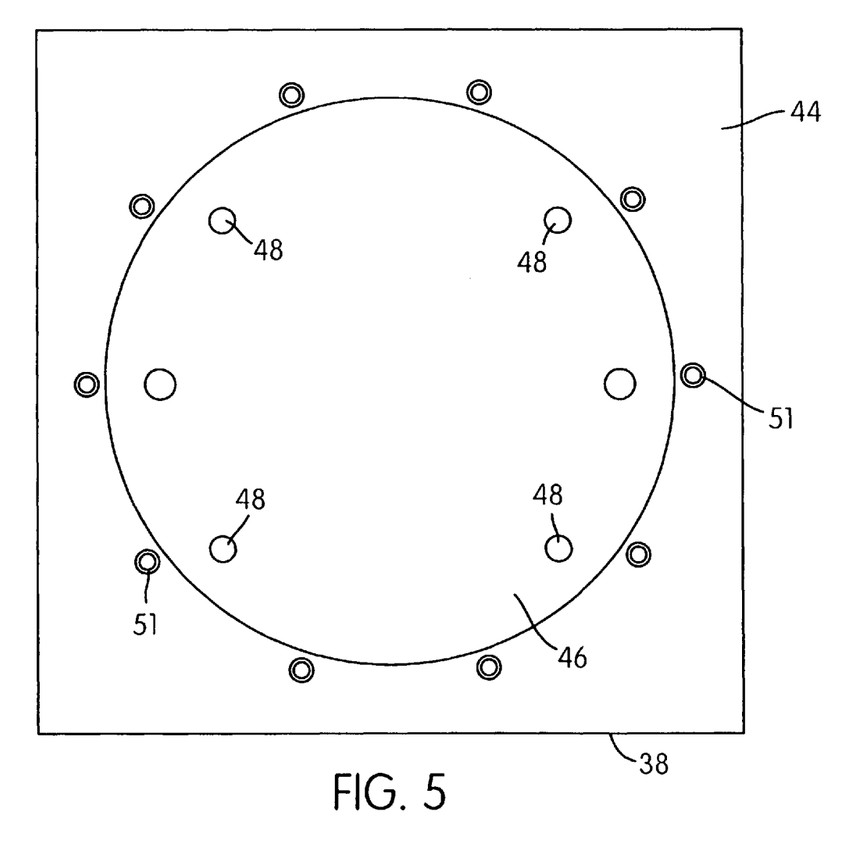
FIG. 5 is a top plan view of a bearing support structure used in the oscillating assembly of FIG. 1.
Figure 6:
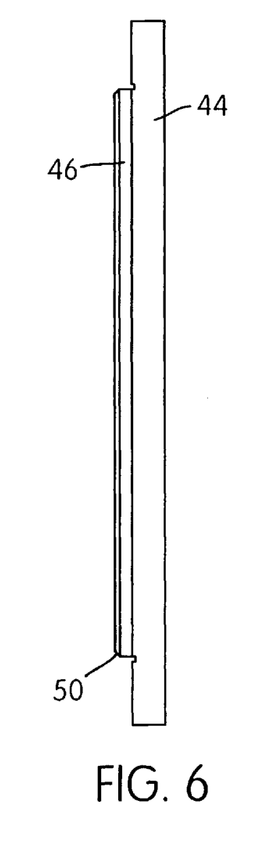
FIG. 6 is a side plan view of the bearing supporting structure illustrated in FIG. 5.

The bearing support structure 38, shown isolated in FIGS. 5 and 6, is mounted on top of the fixed mounting structure 30. As can be seen best in FIG. 5, the bearing support structure 38 comprises a generally square plate-like base portion 44 and a generally circular riser portion 46 formed integrally together. Four fastener-receiving openings 48 are formed through both the base and riser portions 44, 46 and are positioned to align with the fastener-receiving openings 36 on the fixed mounting structure 30. Suitable fasteners such as bolts fixedly secure the bearing support structure 38 to the top wall 34 of the fixed mounting structure 30. Also, it will be noted that the generally circular riser portion 46 has a chamfered upper lip 50 extending around its circumference. A second set of fastener-receiving holes 51 are arranged on the base portion 44 and disposed circumferentially about the riser portion 46.

Referring back to FIGS. 1 and 2, a rotatable bearing assembly in the form of a slewing ring assembly 52 is mounted on top of the bearing support structure 38. The stewing ring assembly 52 is a large bearing capable of rotating under extremely high loads. Typically, such assemblies are used on industrial cranes to facilitate rotation of the crane neck under high load conditions. Although any one of a number of commercially available slewing ring assemblies may be used, the preferred slewing ring assembly is manufactured by Canadian Bearings, Ltd., located in Mississauga, Ontario, Canada (Part No. 200544).

The stewing ring assembly 52 has a generally circular central opening sized to fit over the generally circular riser portion 44 of the bearing support structure 38. A plurality of bolts or other fasteners 53 are inserted into the circumferentially spaced fastener-receiving openings 51 to thereby fixedly secure the slewing ring assembly 52 to the bearing support structure 38.

Figure 7:
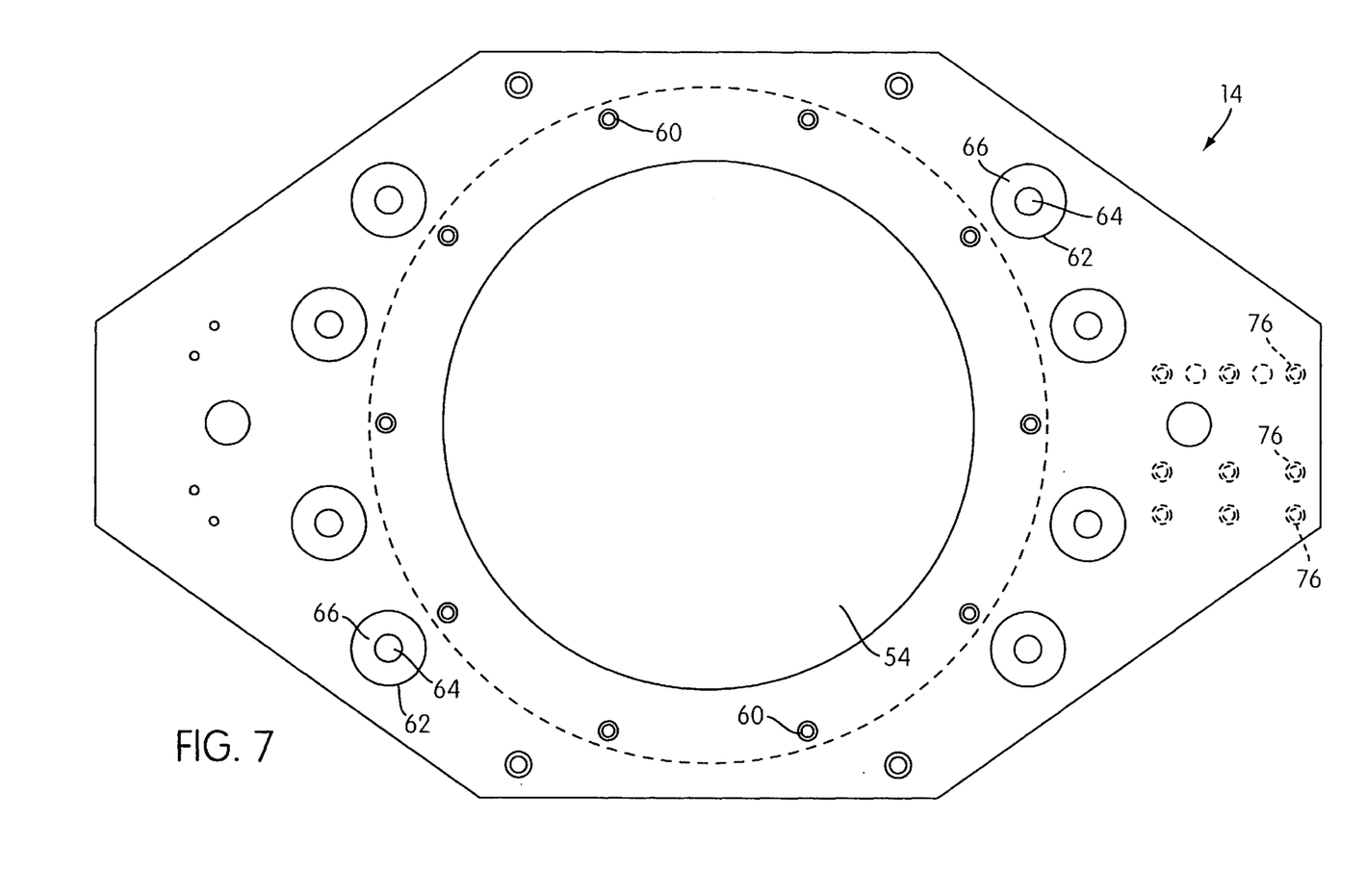
FIG. 7 is a top plan view of the die supporting structure utilized in the oscillating assembly of FIG. 3.
Figure 8:
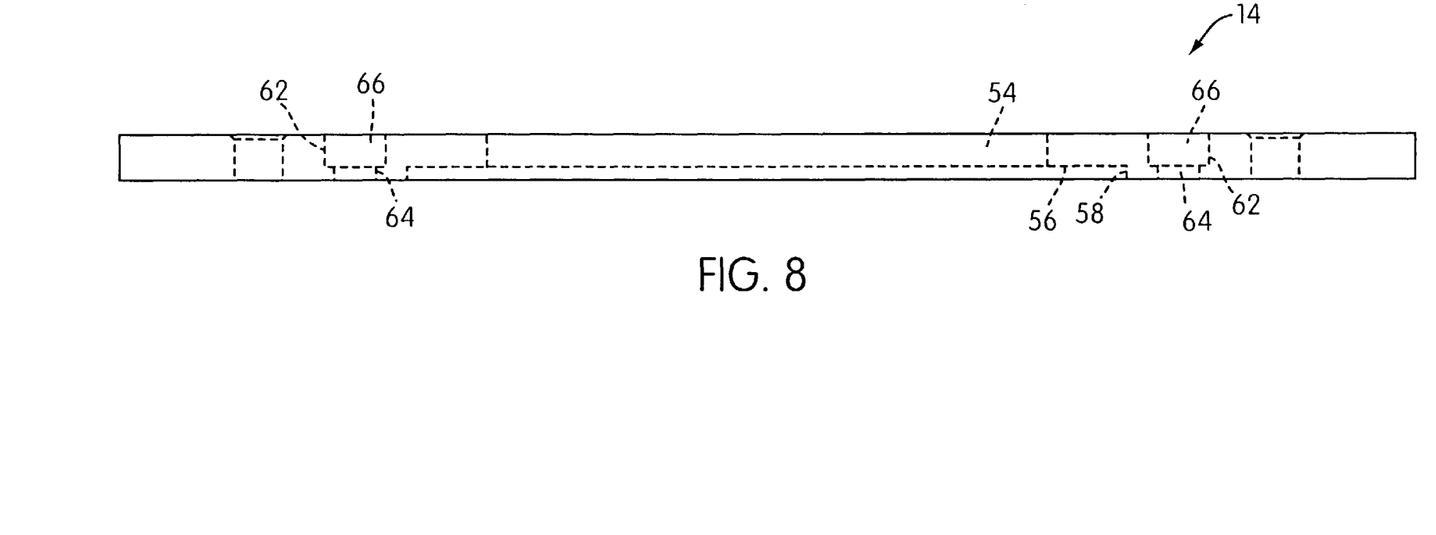
FIG. 8 is a side plan view of the die supporting structure illustrated in FIG. 7.

The die supporting structure 14 is shown isolated in FIGS. 7 and 8. The die supporting structure 14 has an elongated octagonal shape with a width greater in the longitudinal direction than in the transverse direction. A generally circular central opening 54 is formed through the die supporting structure 14. The central opening 54 has an increased diameter portion defined by generally circular slewing ring engaging surfaces 56 and 58. The generally circular slewing ring engaging surfaces 56 and 58 are positioned to be engaged with the slewing ring assembly 52 when the die supporting structure 14 is mounted thereon. A series of circumferentially spaced fastener-receiving openings 60 are formed through the die supporting structure and open to the generally circular stewing ring engaging surface 56. Fasteners (not shown) such as bolts are inserted through the fastener receiving openings 60 to fixedly secure the die supporting structure 14 to the slewing ring assembly 52.

Figure 11:
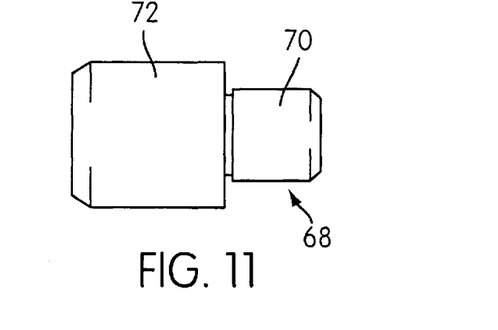
FIG. 11 is a side view of a spring guide pin utilized in the oscillating die assembly of FIG. 1.

Eight spring mounting bores 62 are formed through the die supporting structure 14. The spring mounting bores 62 are arranged symmetrically with respect to the transverse axis and each include a spring guide pin mounting bore 64 of relatively small diameter and a spring receiving counterbore 66 of relatively large diameter. Eight spring guide pins 68, shown isolated in FIG. 11, are received within the spring mounting bores 62. Each spring guide pin 68 comprises a generally cylindrical mounting portion 70 having a diameter corresponding to the spring guide pin mounting bore 64, and a spring guiding portion 72 of greater diameter.

The mounting portion 70 is inserted into mounting bore 64 with the spring guiding portion 72 being disposed within the spring receiving bore 66. A spring 74 is disposed within each of the spring receiving bores 66 of the spring mounting bores 62 so as to surround the spring guiding portion 72 of an associated spring guide pin 68. The spring 74 extends above the upper surface of the die supporting structure 14 when uncompressed such that the blanking die 16 mounted thereon will normally be supported by the springs 74 and spaced slightly above the die supporting structure 14 and the upper surface of the upper portion 22 of the base structure 12. During a cutting stroke, a downwardly directed force is applied to the blanking die so as to compress the springs 74 and cause the blanking die 16 to engage the upper surface of the upper portion 22 of the base structure 12. Thus, during normal conditions, the weight of the blanking die 16 will be supported by the springs 74 and the die supporting structure 14 and during a cutting stroke the weight of the blanking die and the downwardly directed cutting forces will be transferred directly to the base structure 12 through the upper base portion 22 thereof. The preferred spring is a Lamaflex urethane spring commercially available from Anchor Lamina of Mississauga, Ontario, Canada.

Proximate the forward end of the die supporting structure 14 are three generally parallel sets of fastener-receiving openings 76. A pair of cammable members 78 (FIG. 1) are fixedly secured to the underside of the die supporting structure 14 by fasteners received within the fastener receiving openings 76. A back-up cammable member 80 is fixed to the underside of the die supporting structure 14 adjacent to one of the cammable members 78. The cammable members 78 are arranged so as to extend generally parallel to one another and provide interior cammable surfaces 82 facing towards one another. The back-up cammable member 80 also provides an interior cammable surface 84 to be utilized in the event the adjacent camming member 78 fails.

Figure 12:
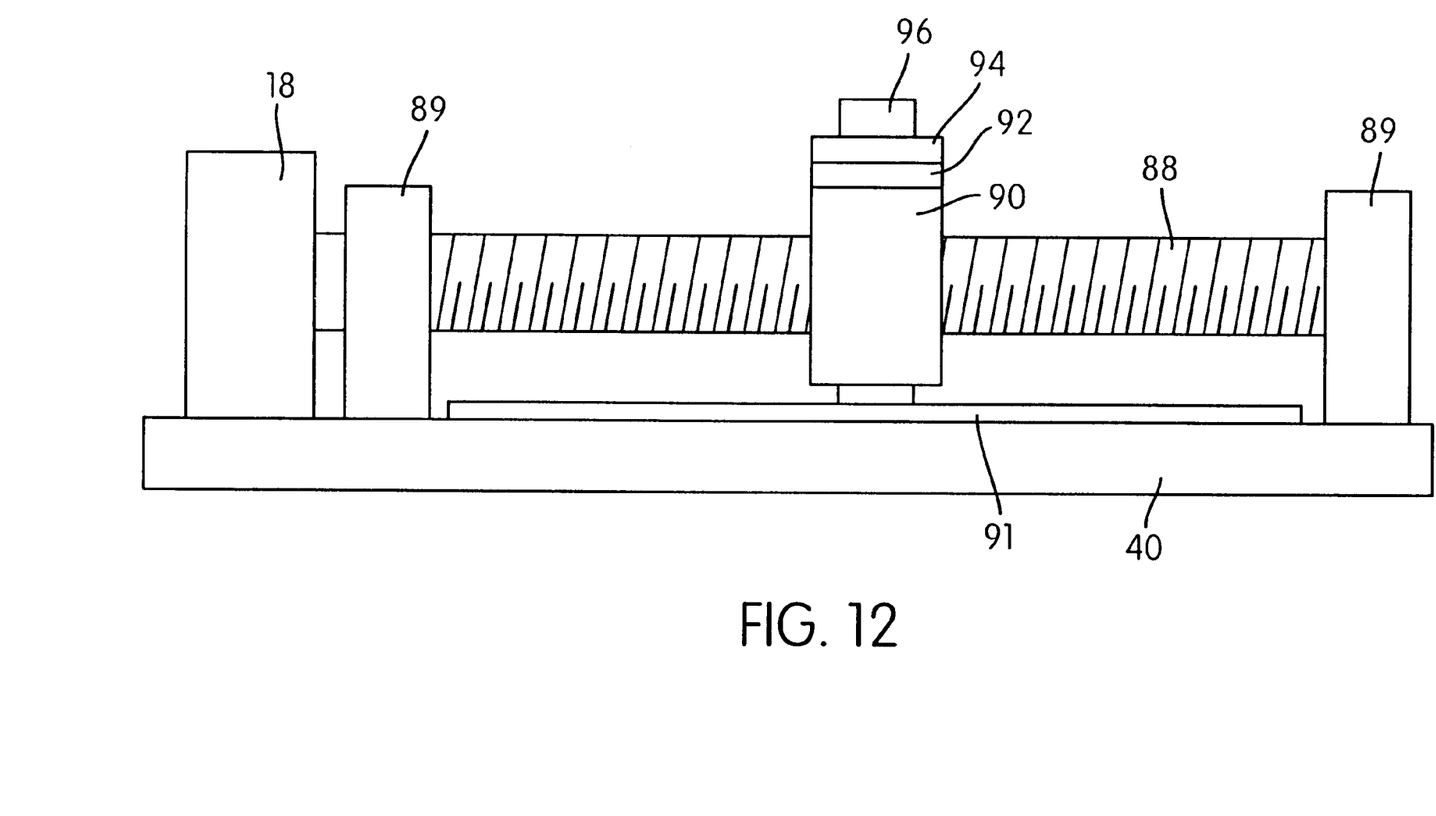
FIG. 12 is a side view of a reversible driving assembly, a rotatable output shaft, a linearly movable die driver and the various components associated therewith.

Referring now to FIG. 12, mounted on top of the riser structure 40 is the reversible rotary driving assembly 18. The reversible driving assembly 18 preferably comprises a Digital AC servomotor manufactured by Indramat of Germany and commercially available from Basic Technologies of Burlington, Ontario, Canada. The reversible driving assembly 18 also comprises a servomotor controller. The servomotor controller is also manufactured by Indramat and is commercially known as the DKS (Digital Compact Drive). The DKS is a self-contained power supply and digital drive which combines motion control, power supply, and amplification into one module for controlling the servomotor. Various interchangeable plug-in modules can be used to operate the DKS. For example, a programmed control card can provide instructions to the controller. Also, the DKS can be communicated with a master control system via either a digital or analog interface. Optionally, feedback modules may be utilized depending on particular applications.

The reversible driving assembly 18 rotationally drives a rotatable output shaft 88 in the form of a ball screw which extends transversely with respect to the base structure 12. The opposing ends of the shaft 88 are rotatably supported by shaft supporting structures in the form of bearing supports 89.

Figure 9:
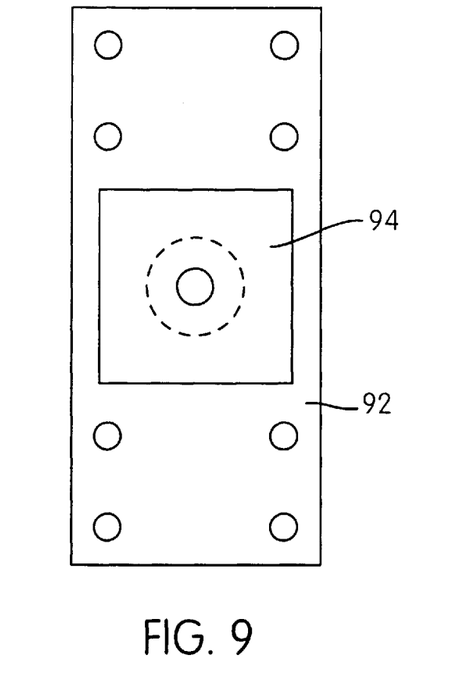
FIG. 9 is a top view of the guided saddle and bearing block utilized in the oscillating die assembly of FIG. 1.
Figure 10:
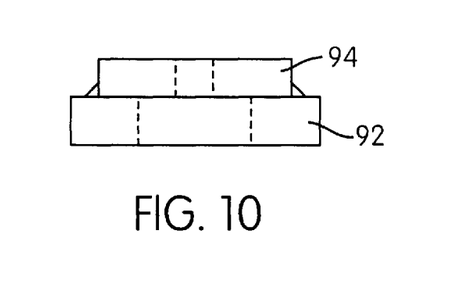
FIG. 10 is a side view of the guided saddle and bearing block shown in FIG. 9.

The exterior surface of the shaft 88 is threaded and a linearly movable die driver 90 is threadingly engaged with the shaft 88. The preferred die driver 90 is a ball nut threadingly engaged with the rotatable shaft 88 and supported from below by a linear motion bearing 91 along its entire length of travel. A guided saddle 92 is mounted on top of the linearly movable die driver 90 and a bearing block 94 is mounted to the guided saddle 92. As can be seen in FIGS. 9 and 10 the bearing block 94 and guided saddle 92 are formed integrally together. A generally cylindrical camming member 96 in the form of a standard cam follower is fixedly secured to the bearing block 94. The camming member 96 is received between the cammable members 78 secured to the underside of the die supporting structure 14 such that the die driver 90 operatively connects the die supporting structure 14 with the rotatable shaft 88. Together the rotatable shaft 88, the linearly movable die driver 90, and their associated components constitute the above-mentioned motion transmitting assembly 20.

During operation, the reversible driving assembly 18 causes pivotal movement of the die supporting structure 14 by rotating the output shaft 88 so as to linearly move the driver 90 along the length of the shaft 88. As the driver 90 moves linearly along the shaft 88, the camming member 96 will engage one of the cammable interior surfaces 82 of the camming member 78 in a camming relationship so as to pivot the die supporting structure 14 about its pivot axis. Thus, the rotational movement of the shaft 88 is translated into linear movement of the linearly movable die driver 90, which in turn directly drives the die supporting structure 14 about its pivot axis by virtue of the camming engagement between camming member 96 and one of the cammable members 78.

Referring back to FIGS. 1 and 2, the blanking die 16 is mounted on the die supporting structure 14 with a pair of die mounting posts 97. Each die mounting post 97 is inserted into a generally cylindrical bore 98 formed in the die 16 itself. In addition, the bore 98 may have a self-lubricated bushing 99 inserted therein. The die mounting posts 97 insure that the die 16 pivots with the supporting structure 14 by preventing any relative movement therebetween.

Operation

Figure 13:
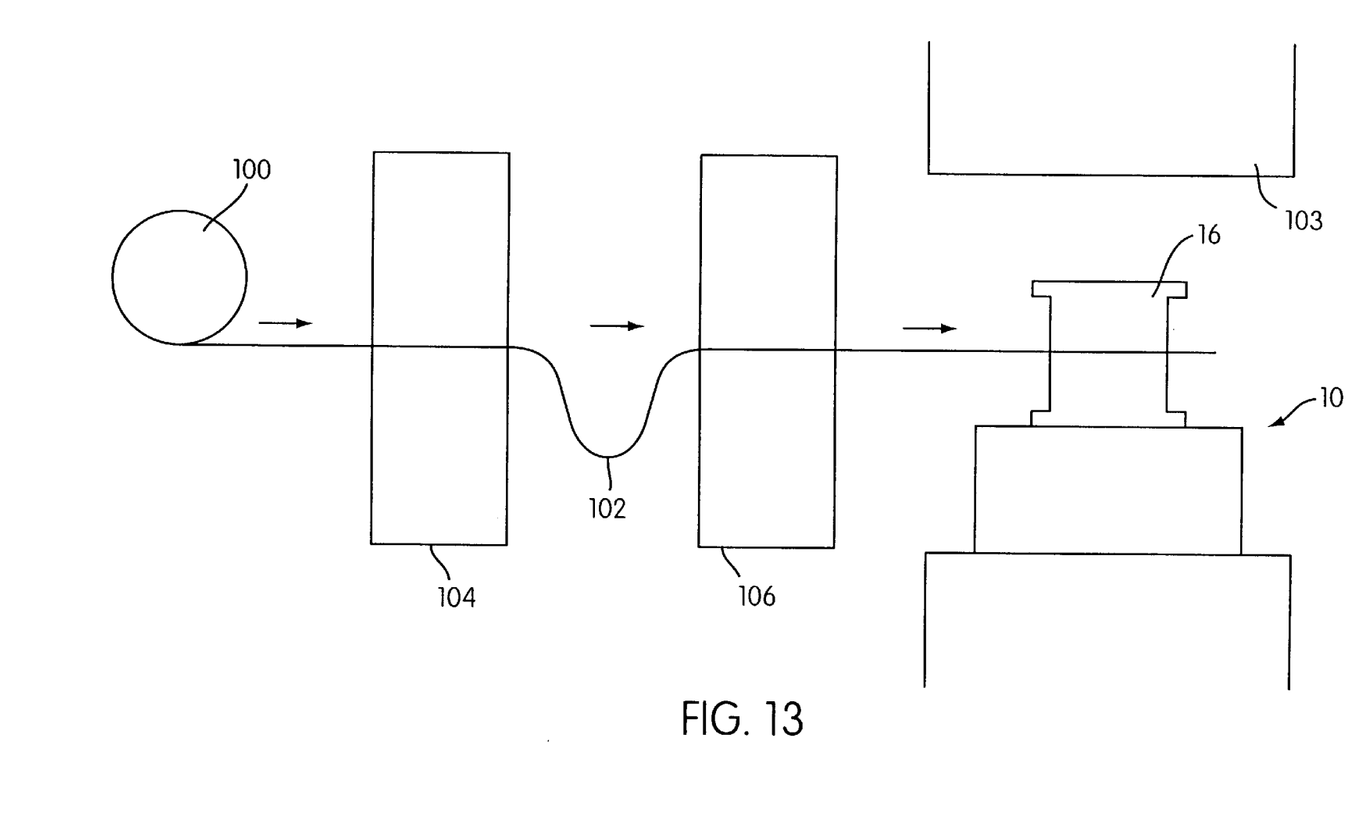
FIG. 13 is a schematic side view illustrating the process in which the oscillating assembly of the present invention is utilized.
Figure 14:
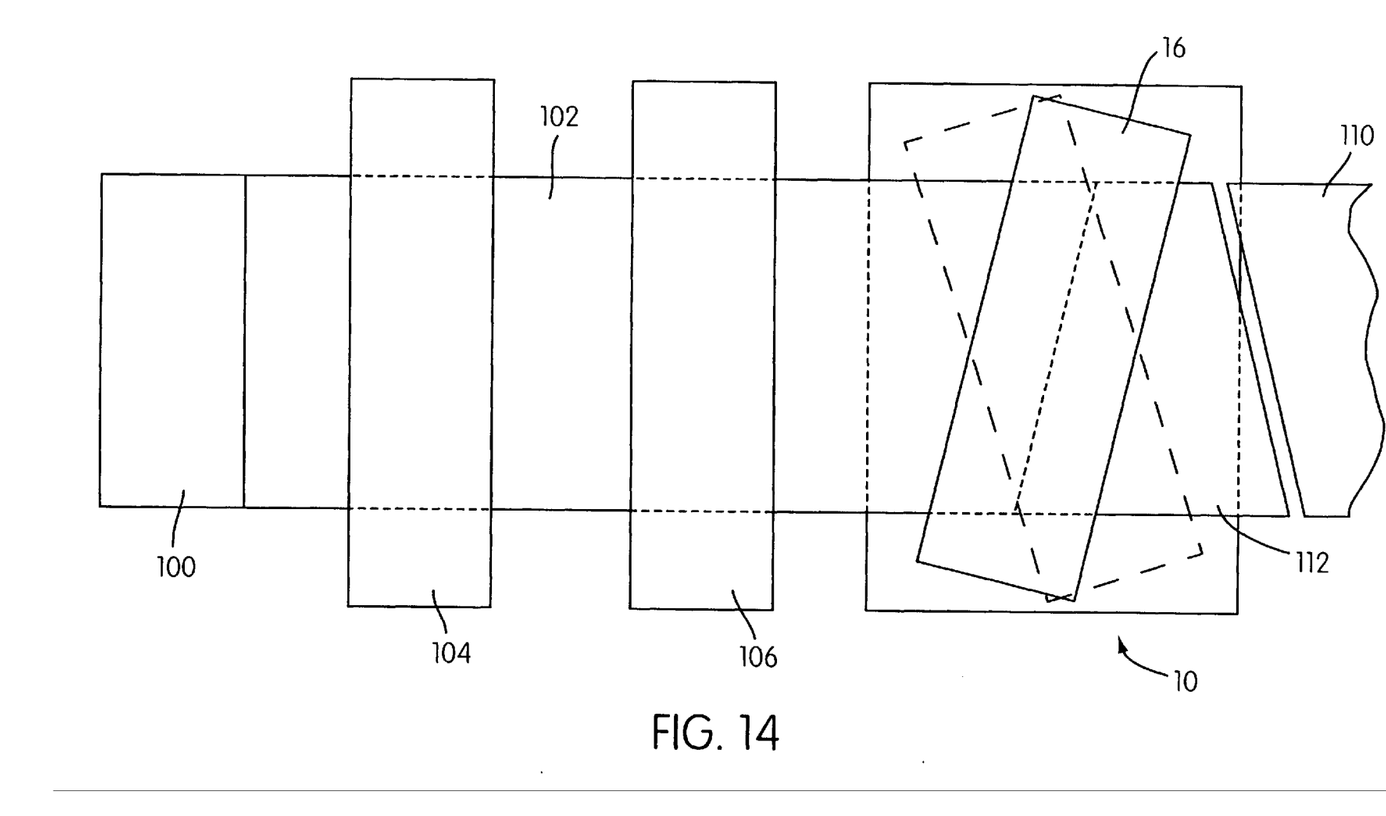
FIG. 14 is a schematic top view of the process shown in FIG. 13 illustrating the oscillating assembly being utilized to cut trapezoidal metal blanks.

The operation of the oscillating assembly 10 of the present invention can be best understood in reference to FIGS. 13 and 14. FIGS. 13 and 14 schematically illustrate top and side views, respectively, of the process line in which the oscillating assembly 10 is used. A coil 100 contains a supply of sheet material 102. Usually the sheet material will be steel, but it is contemplated that the principles of the present invention can be used in a process for cutting rubber, fabric, or other sheet material blanks. A straightener 104 and a feeder 106 are provided downstream from the coil 100 in the feeding direction.

The sheet material 102 is unrolled from the coil 100, fed through the straightener 104 and the feeder 106, and disposed within the blanking die 16. The straightener 104 straightens the sheet material 102 as it is unrolled from the coil 100 and the feeder 106 moves the sheet material 102 in the feeding direction relative to the blanking die 16.

With the sheet material 102 disposed within the blanking die 16, the reversible driving assembly 18 rotates the output shaft 88 in a first rotational direction so as to move the linearly movable die driver 90 in a first linear die driving direction such that the die supporting structure 14 rotates to a first cutting position (shown in solid lines in FIG. 14). In the first cutting position, a cutting press 108 (FIG. 13) moves downwardly through a cutting stroke into engagement with the blanking die 16 such that the blanking die 16 cuts the sheet material 102 disposed therein so as to separate a first blank 110 from the sheet material 102.

The feeder 106 then moves the sheet material 102 in the feeding direction relative to the blanking die 16 as the cutting press 108 moves through its return stroke and the first blank 110 is removed from the blanking die 16. The reversible driving assembly 18 rotates the rotatable shaft 88 in a second rotational direction opposite the first rotation direction so as to move the linearly movable die driver 90 in a second linear die driving direction opposite the first generally linear die driving direction such that the die supporting structure 14 pivots to a second cutting position (shown in broken lines in FIG. 14). In the second cutting position, the cutting press 108 again moves downwardly through its cutting stroke into engagement with the blanking die 16 such that the blanking die 16 cuts through the sheet material disposed therein so as to separate a second blank 112 from the sheet material 102. This cycle is repeated with the die supporting structure 14 being pivoted between its first and second cutting position in an oscillatory manner and the sheet material 102 being moved relative to the die 16 in the feeding direction.

A pair of repositionable limit switches (not shown) may optionally be mounted to the base structure 12 on opposing sides of the platform 14 (or the die 16). These limit switches provide feedback signals to the servomotor controller indicating when the platform 14 has reached a certain angular position. More specifically, the limit switch generates and transmits this feedback signal when the switch element thereof is engaged by the platform 14 (or the die 16). Thus, during operation the controller may be adapted such that the servomotor rotates the shaft in one rotational direction until a first limit switch is contacted and then reverse itself and rotates the shaft in the opposite rotational direction until the second switch is contacted. The responsibility of these switches allows the angular displacement of the platform 14 and die 16 to be easily varied.

As can be appreciated from FIG. 14, the blanks 110, 112 are cut along a straight edge and are generally trapezoidal in shape. Cutting trapezoidal blanks provides a savings in material costs in situations where much of a rectangular blank would have to be trimmed of and thrown away as scrap. A good example of use for trapezoidal blanks is the manufacturing of automobile hoods. Oftentimes, hoods tend to be narrow towards the front of the vehicle and widen towards the passenger compartment. A trapezoidal blank can be formed to have such a configuration to begin with, whereas portions of a rectangular blank would have to be trimmed off to provide a tapered configuration.

It is to be understood that blanks of varying types and configurations may be utilized with the assembly 10 of the present invention. For example, the cutting edge of the blanking die may be curved or wavy so as to form blanks having irregular contours. One significant advantage of the disclosed assembly 10 is that it may be used interchangeably with such various blanks, thus allowing a manufacturer to change dies to create various types of blanks using only one oscillating assembly 10.

The disclosed die assembly 10 also offers significant advantages over other assemblies. It is estimated that the assembly 10 can oscillate the blanking die 16 over a total range of 10° (each cutting position being angularly displaced 5° from a central axis extending in the feeding direction) to achieve a rate of 45 cutting strokes/min., allowing 1.0 sec. to index the material and 0.3 sec. for cutting and dwell time associated with press 108. Over a total range of 60° (each cutting position being angularly displaced 30° from the above-mentioned central axis), the assembly can oscillate the blanking die 16 to achieve a rate of 20 cutting strokes/min., allowing 2.7 sec. to index the material 102 and 0.3 sec. for cutting and dwell time associated with the cutting press 108. The use of a reversible driving assembly 18 in conjunction with a linearly movable die driver 90 also provides excellent control over the movement of the die supporting structure and reduces the complexity and potential wearing down of parts involved with using a plurality of intermeshed gears. In addition, it can be appreciated that the threaded engagement between the linearly movable die driver 90 and the rotatable output shaft 88 also provides a high degree of control. Specifically, the pitch of the threads can be increased for more precise operations and can be decreased where high speed is more important than high precision.

It will thus be seen that the objects of the present invention have been fully and effectively accomplished. It will be realized, however, that the foregoing preferred and specific embodiment has been shown and described for the purpose of illustrating the functional and structural principles of the present invention and is subject to change without departure from such principles. Therefore, the present invention includes all modifications and alterations within the spirit and scope of the appended claims.

What is claimed is:

1. An oscillating assembly for pivoting a blanking die that is constructed and arranged to cut blanks from sheet material, said oscillating assembly comprising:
    a die supporting structure that pivots about a pivot axis, said die supporting structure being constructed and arranged to receive and support said die such that said sheet material can be fed into said die in a feeding direction and such that said pivoting of said die supporting structure pivots said die relative to said sheet material;
    a reversible rotary driving assembly that has a rotatable output shaft, said driving assembly being constructed and arranged to rotate said shaft in opposing first and second rotational directions;
    a linearly movable die driver operatively connected to said output shaft such that (a) rotating said shaft in said first rotational direction thereof moves said die driver generally linearly in a first die driving direction and (b) rotating said shaft in said second rotational direction thereof moves said die driver generally linearly in a second die driving direction opposite said first die driving direction;
    said die driver being operatively connected to said die supporting structure such that (a) moving said die driver in said first die driving direction thereof as aforesaid pivots said die supporting structure to a first cutting position wherein said blanking die can cut a first blank from said sheet material fed therein and (b) after cutting said first blank and advancing said sheet material relative to said die in said feeding direction, moving said die driver in said second die driving direction thereof as aforesaid pivots said die supporting structure to a second cutting position wherein said blanking die can cut a second blank from said sheet material.

2. An oscillating assembly according to claim 1, wherein said reversible rotary driving assembly comprises a servomotor and a controller for controlling operation of said servomotor.

3. An oscillating assembly according to claim 2, wherein said rotatable output shaft is an externally threaded and wherein said die driver is an internally threaded nut that is mounted on said shaft such that the threads of said shaft and the threads of said nut are engaged in a cooperating threaded relationship.

4. An oscillating assembly according to claim 3, further comprising a fixed base and wherein said die supporting structure is pivotally mounted to said base.

5. An oscillating assembly according to claim 4, wherein said fixed base has an upper surface that is elevated higher than an upper surface of said die supporting structure and further comprising:
    a plurality of springs that normally support said die in spaced relation above the upper surface of said fixed base and that resiliently compress during the cutting strokes of said die to enable said die to engage the upper surface of said base whereby forces resulting from said cutting strokes are transferred to said base rather than to said die supporting structure.

6. An oscillating assembly according to claim 5, wherein said die supporting structure is pivotally mounted to said base by a slewing ring assembly.

7. An oscillating die assembly comprising:
    a blanking die constructed and arranged to cut blanks from sheet material;
    a die supporting structure that pivots about a pivot axis, said die being supported by said die supporting structure such that said sheet material can be fed into said die in a feeding direction and such that said pivoting of said die supporting structure pivots said die relative to said sheet material;
    a reversible rotary driving assembly that has a rotatable output shaft, said driving assembly being constructed and arranged to rotate said shaft in opposing first and second rotational directions;
    a linearly movable die driver operatively connected to said output shaft such that (a) rotating said shaft in said first rotational direction thereof moves said die driver generally linearly in a first die driving direction and (b) rotating said shaft in said second rotational direction thereof moves said die driver generally linearly in a second die driving direction opposite said first die driving direction;
    said die driver being operatively connected to said die supporting structure such that (a) moving said die driver in said first die driving direction thereof as aforesaid pivots said die supporting structure to a first cutting position wherein said blanking die can cut a first blank from said sheet material fed therein and (b) after cutting said first blank and advancing said sheet material relative to said die in said feeding direction, moving said die driver in said second die driving direction thereof as aforesaid pivots said die supporting structure to a second cutting position wherein said blanking die can cut a second blank from said sheet material.

8. An oscillating die assembly according to claim 7, wherein said reversible rotary driving assembly comprises a servomotor and a controller for controlling operation of said servomotor.

9. An oscillating die assembly according to claim 8, where in said rotatable output shaft is an externally threaded and wherein said die driver is an internally threaded nut that is mounted on said shaft such that the threads of said shaft and the threads of said nut are engaged in a cooperating threaded relationship.

10. An oscillating die assembly according to claim 9, further comprising a fixed base and wherein said die supporting structure is pivotally mounted to said base.

11. An oscillating die assembly according to claim 10, wherein said fixed base has an upper surface that is elevated higher than an upper surface of said die supporting structure and further comprising:

a plurality of springs that normally support said die in spaced relation above the upper surface of said fixed base and that resiliently compress during the cutting strokes of said die to enable said die to engage the upper surface of said base whereby forces resulting from said cutting strokes are transferred to said base rather than to said die supporting structure.

12. An oscillating die assembly according to claim 11, wherein said die supporting structure is pivotally mounted to said base by a slewing ring assembly.

* * * * *